US012780452B2

(12) United States Patent
Chen et al.

(10) Patent No.: US 12,780,452 B2
(45) Date of Patent: Nov. 3, 2026

(54) EJECTION DEPLOYMENT AND RETRIEVAL MECHANISM WITH REPEATABLE UNLOCKING AND LOCKING FOR TETHERED SATELLITE AND WORKING METHOD THEREOF

(71) Applicant: Nanjing University of Aeronautics and Astronautics, Nanjing (CN)

(72) Inventors: Ti Chen, Nanjing (CN); Shuo Chen, Nanjing (CN); Zhengtao Wei, Nanjing (CN); Dongping Jin, Nanjing (CN); Hao Wen, Nanjing (CN); Weidong Chen, Nanjing (CN)

( * ) Notice: Subject to any disclaimer, the term of this patent is extended or adjusted under 35 U.S.C. 154(b) by 0 days.

(21) Appl. No.: 19/291,563

(22) Filed: Aug. 5, 2025

(65) Prior Publication Data

US 2025/0353618 A1 Nov. 20, 2025

(30) Foreign Application Priority Data

Jan. 8, 2025 (CN) ......................... 202510027550.0

(51) Int. Cl.
*B64G 1/64* (2006.01)

(52) U.S. Cl.
CPC ......... *B64G 1/6457* (2023.08); *B64G 1/6464* (2023.08); *B64G 1/648* (2013.01)

(58) Field of Classification Search
CPC ..... B64G 1/6457; B64G 1/6464; B64G 1/648
See application file for complete search history.

(56) References Cited

U.S. PATENT DOCUMENTS

| | | | | |
|---|---|---|---|---|
| 3,045,779 A * | 7/1962 | Rosenthai | ............ | B64G 1/6457 185/37 |
| 2020/0347977 A1 * | 11/2020 | Domburg | ............. | B64G 1/6462 |
| 2025/0353618 A1 * | 11/2025 | Chen | .................... | B64G 1/6457 |

* cited by examiner

*Primary Examiner* — Jessica B Wong

(57) ABSTRACT

The present invention discloses an ejection deployment and retrieval mechanism for a tethered satellite with repeatable unlocking and locking and a working method thereof, the present invention includes a separation ejection docking assembly and a sub-satellite; the separation ejection docking assembly includes an ejection sleeve, a locking mechanism, and a sub-satellite connector, the ejection sleeve adopts a two-stage internal-external sliding connection and provides initial kinetic energy to the sub-satellite by compressing a spring; the locking mechanism is mounted inside the ejection sleeve, one end of the sub-satellite connector is connected to the sub-satellite, and another end of the sub-satellite connector is slidably engaged with the locking mechanism to complete the locking/unlocking operations of the sub-satellite. The present invention can effectively reduce the complexity of the mechanism and improve the overall reliability of the mechanism without the additional control assembly to control the unlocking and locking of the mechanism.

10 Claims, 12 Drawing Sheets

EJECTION DEPLOYMENT AND RETRIEVAL MECHANISM WITH REPEATABLE UNLOCKING AND LOCKING FOR TETHERED SATELLITE AND WORKING METHOD THEREOF

TECHNICAL FIELD

The present invention belongs to the field of deployment and retrieval of tethered satellites, specifically relating to an ejection deployment and retrieval mechanism for a tethered satellite with repeatable unlocking and locking and a working method thereof.

BACKGROUND

As a novel space flight system, tethered satellite systems have enormous application potential in fields such as space junk cleanup, artificial gravity, and deep space exploration. Space maneuvering tasks with a large range and across orbits are performed through tethered satellites using long and flexible space tethers, and the orbital maneuvering process is continuous, without the requirement for repeated orbit changes, thereby exhibiting a very wide range of applications in space.

The in-orbit flight of tethered satellites mainly includes three phases: deployment, station-keeping, and retrieval. Reliable deployment and retrieval are the premise and foundation for achieving the orbital maneuvering tasks, which involve issues such as initial separation, deployment, retrieval, and docking locking. A reliable ejection mechanism is required to provide kinetic energy to the load during the initial separation phase. Meanwhile, the ejection deployment mechanism also requires functions for guiding docking and locking to effectively retrieve tethered satellites. For example, patent Application CN117087880A discloses a low-impact ejection mechanism for deployment and retrieval of tethered satellite, including at least one ejection assembly, wherein the ejection assembly includes a sub-satellite, an ejection module, a locking module, a tether deployment and retrieval module, and a velocity-limiting module. The present invention can achieve the ejection deployment and retrieval locking of sub-satellites, can be repeatedly used for ground simulation experiments of tethered satellite deployment and retrieval, and helps to adjust the attitude of sub-satellites and complete their retrieval. The sub-satellite can be ejected and separated at a predetermined velocity, without generating too much resistance when retrieving and locking, and ejection-retrieval experiments can be repeated autonomously through the control system. The velocity-limiting module can automatically lock based on a preset acceleration value to avoid impact during the deployment of the sub-satellite; nevertheless, the assembly consists of many components and has a complex structure, particularly the additional unlocking motor mounted at the separation ejection assembly for unlocking, which significantly affects the overall system reliability. Therefore, it is necessary to develop an ejection deployment and retrieval mechanism in a simple and reliable manner without the unlocking motor.

SUMMARY

The present invention provides an ejection deployment and retrieval mechanism for a tethered satellite with repeatable unlocking and locking and a working method thereof, which can effectively reduce the complexity of the mechanism and improve the overall reliability of the mechanism without the additional control assembly to control the unlocking and locking of the mechanism.

In order to achieve the above objective, the present invention adopts the following technical scheme:

an ejection deployment and retrieval mechanism with repeatable unlocking and locking for tethered satellite, including a separation ejection docking assembly and a sub-satellite; the separation ejection docking assembly is configured to control unlocking/locking of the sub-satellite;

the separation ejection docking assembly includes a sub-satellite connector, an ejection sleeve and a locking mechanism, the ejection sleeve adopts a two-stage internal-external sliding connection and provides initial kinetic energy to the sub-satellite via a spring; the locking mechanism is mounted inside the ejection sleeve, one end of the sub-satellite connector is connected to the sub-satellite, and another end of the sub-satellite connector is slidably engaged with the locking mechanism to complete the locking/unlocking operations of the sub-satellite.

The locking mechanism includes an upper locking base and a lower locking base, the upper locking base and the lower locking base are provided with a guide groove, respectively, the guide groove formed after the upper locking base and the lower locking base are aligned at a certain angle is engaged with a limiting bulge on a sub-satellite connector to achieve automatic locking and unlocking functions;

the guide grooves are sawtooth-shaped, compared with the guide groove of the lower locking base, the guide groove of the upper locking base provided with two notches at the top, enabling the limiting bulge of a docking rod to enter or exit the guide groove through the notches, when the limiting bulge on the docking rod contacts the lower guide groove, it rotates by a certain angle under an action of the guide groove, thereby being locked by a notch-free part of the upper guide groove to achieve the locking function, by repeating the same action, the limiting bulge rotates to the notched part, so that the docking rod is deployed to achieve the unlocking function.

The sub-satellite connector includes a docking plate and the docking rod, one end of the docking rod is provided with the limiting bulge that engages with the guide groove of the upper locking base and the lower locking base, and the other end of the docking rod is connected to the sub-satellite by engaging with the docking plate.

Beneficial effects: the present invention provides an ejection deployment and retrieval mechanism with repeatable unlocking and locking for tethered satellite and working method thereof, a locking device capable of repeated unlocking and locking is designed to cooperate with the tether retrieval action to achieve the ejection deployment and retrieval locking of the sub-satellite, and enabling it to be repeatedly used for the deployment and retrieval experiments of tethered satellites without the requirement for additional actuator motors to control the locking device; the separation ejection docking assembly can eject and separate the sub-satellite at a certain velocity, without generating too much resistance when retrieving and locking, and ejection-retrieval experiments can be repeated autonomously solely through the control of the step motor of the deployment and retrieval of the tether; and the locking device provided by the present invention can be automatically locked after the sub-satellite is retrieved into a fixed position to prevent the sub-satellite from detaching and affecting the experimental results.

Figure 1:
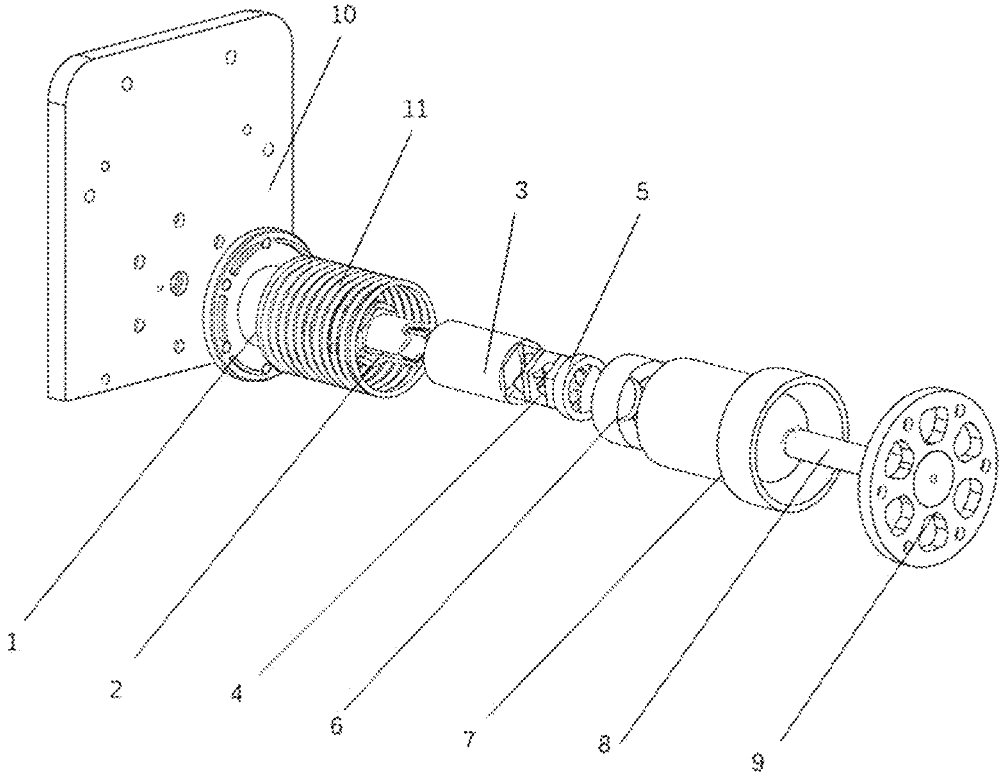
FIG. 1 is an exploded view of a separation ejection docking assembly module of an ejection mechanism according to an embodiment of the present invention.

reference numerals in figures: 1—an inner sleeve, 2—a lower locking base, 3—a fixed sleeve, 4—an upper locking base, 5—a docking guide cone, 6—a sleeve limiting cover, 7—an outer sleeve, 8—a docking rod, 9—a docking plate, 10—a supporting plate, 11—a spring.

DETAILED DESCRIPTION OF THE EMBODIMENTS

Figure 2:
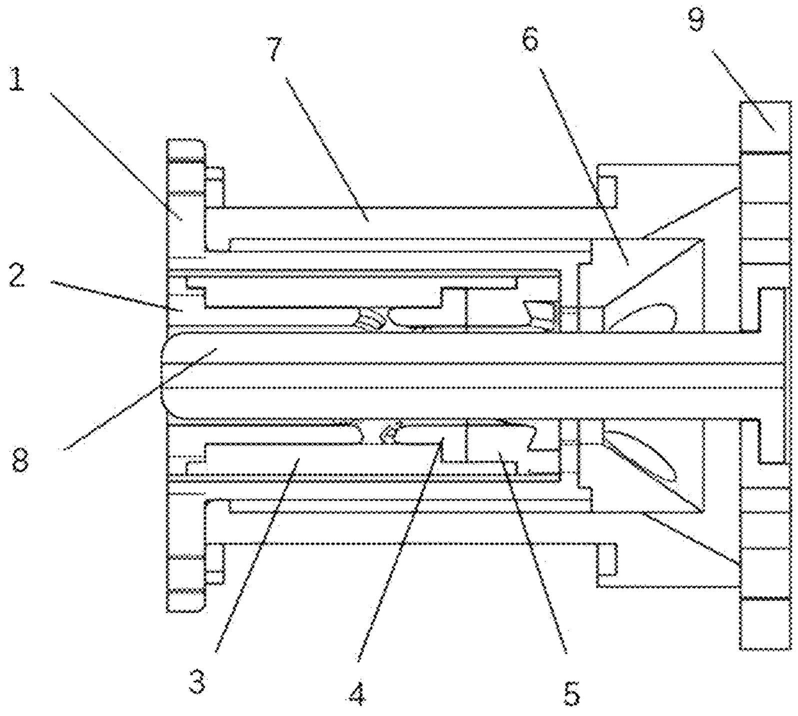
FIG. 2 is a cross-sectional view of a separation ejection docking assembly module of an ejection mechanism according to an embodiment of the present invention.
Figure 3:
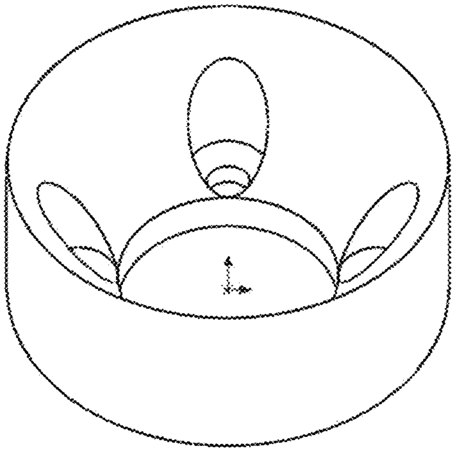
FIG. 3 is a schematic diagram of a sleeve limiting cover of an ejection mechanism according to an embodiment of the present invention.
Figure 4:
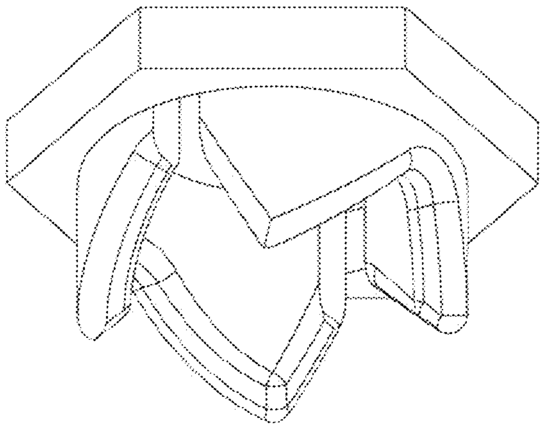
FIG. 4 is a schematic diagram of an upper locking base of an ejection mechanism according to an embodiment of the present invention.

The following is a detailed description of the present invention with reference to the accompanying drawings and specific embodiments:

As shown in FIGS. 1 and 2, an ejection deployment and retrieval mechanism with repeatable unlocking and locking for tethered satellite, including an inner sleeve 1, a locking mechanism, a sleeve limiting cover 6, an outer sleeve 7, a docking rod 8, a docking plate 9, and a spring 11; the outer sleeve 7 is on the outside of the inner sleeve 1 and is slidably connected to the inner sleeve 1, the locking mechanism is positioned inside the inner sleeve 1, one end of the docking rod 8 is connected to the sub-satellite by engaging with the docking plate 9, and the other end of the docking rod 8 engages with the locking mechanism to achieve locking and unlocking;

the base of the inner sleeve 1 is provided with six evenly distributed M3 threaded holes for connection with the bottom supporting plate 10, while the top of the inner sleeve 1 is provided with four M2 threaded holes for connection with the sleeve limiting cover 6; the inner side of the outer sleeve 7 is provided with a step that engages with the sleeve limiting cover 6 to limit the maximum ejection displacement; the upper part of the sleeve limiting cover 6 is designed with a tapered shape to facilitate guiding the docking rod 8 to enter, and four through holes are circumferentially arranged, the four through holes are connected to the top of the inner sleeve 1 via M2 screws, the diameter of the sleeve limiting cover 6 is slightly larger than the outer diameter of the inner sleeve and equal to the inner diameter of the outer sleeve 7, the inner diameter of the step on the outer sleeve 7 equals the outer diameter of the inner sleeve 1, thereby achieving the function of limiting the maximum displacement of the sleeve through the above engaging; the spring 11 is sleeved outside the outer sleeve 7, and the grooves are arranged at the bottom of the inner sleeve 1 and the top of the outer sleeve 7 for fixing the spring.

The locking mechanism includes the lower locking base 2, the fixed sleeve 3, the upper locking base 4, and the docking guide cone 5; the guide groove is formed between the lower locking base 2 and the upper locking base 4, where the guide grooves are sawtooth-shaped, and the lower locking base 2 and the upper locking base 4 are aligned at a certain angle; the sawtooth-shaped low end of the guide groove of the locking base 4 is provided with two symmetrical notches, enabling the limiting bulge of the docking rod to enter the guide groove through the notches, when the limiting bulge on the docking rod contacts the lower guide groove, it rotates by the certain angle under the action of the guide groove, thereby being locked by the notch-free part of the upper guide groove to achieve locking, by repeating the same action, the limiting bulge rotates to the notched part, so that the docking rod is deployed to achieve unlocking.

Figure 11:
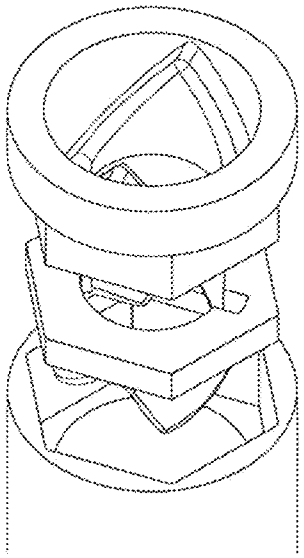
FIG. 11 is an assembly schematic diagram of a docking guide cone, an upper locking base and a fixed sleeve of an ejection mechanism according to an embodiment of the present invention.
Figure 12:
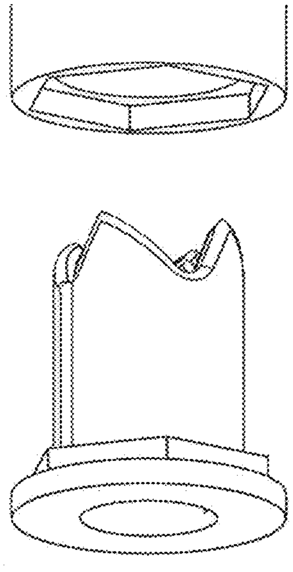
FIG. 12 is an assembly schematic diagram of a lower locking base and a fixed sleeve of an ejection mechanism according to an embodiment of the present invention.

As shown in FIGS. 11 and 12, the lower locking base 2, upper locking base 4, and docking guide groove are required to be positioned at specific angles in order to achieve the corresponding functions, so a hexagonal step is designed, which can be positioned at specific angles in engaging with the inner hexagonal step of the fixed sleeve 3; the docking guide cone 5 and upper locking base 4 are positioned in the inner hexagonal groove at the upper part of the fixed sleeve 3, and the lower locking base 2 is positioned in the inner hexagonal groove at the lower part of the fixed sleeve 3, a cylindrical module is formed after the four parts of the locking mechanism are assembled, which can be directly positioned in the cylindrical cavity of the inner sleeve 1.

Figure 5:
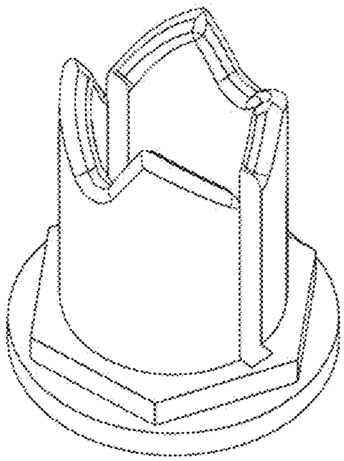
FIG. 5 is a schematic diagram of a lower locking base of an ejection mechanism according to an embodiment of the present invention.
Figure 6:
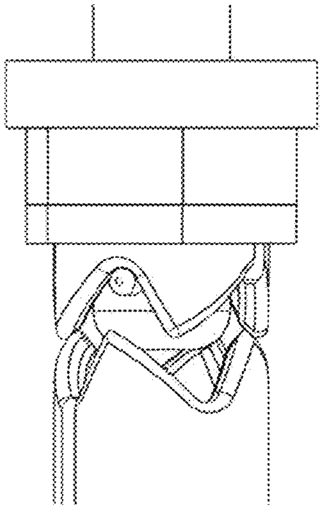
FIG. 6 is a schematic diagram a of a working process of a locking base module of an ejection mechanism according to an embodiment of the present invention.
Figure 7:
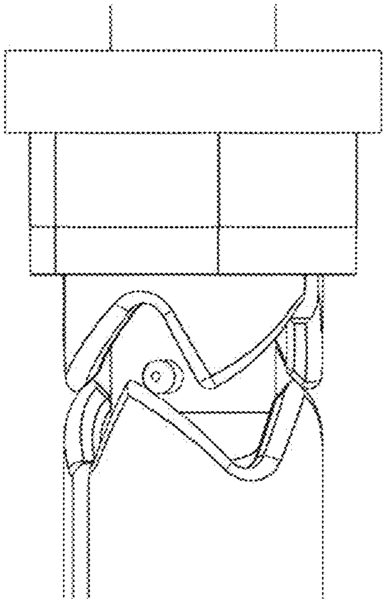
FIG. 7 is a schematic diagram b of a working process of a locking base module of an ejection mechanism according to an embodiment of the present invention.
Figure 8:
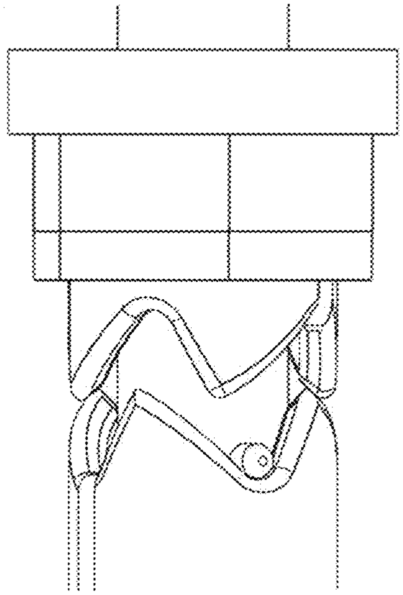
FIG. 8 is a schematic diagram c of a working process of a locking base module of an ejection mechanism according to an embodiment of the present invention.
Figure 9:
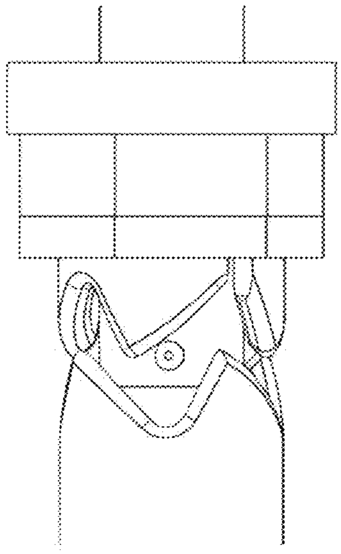
FIG. 9 is a schematic diagram d of a working process of a locking base module of an ejection mechanism according to an embodiment of the present invention.
Figure 10:
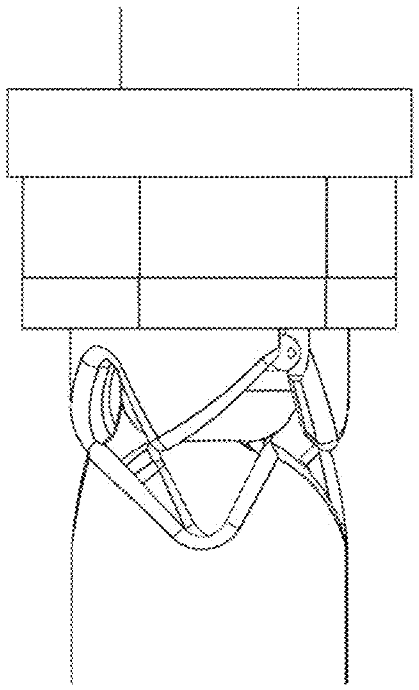
FIG. 10 is a schematic diagram e of a working process of a locking base module of an ejection mechanism according to an embodiment of the present invention.

A working method for the above-mentioned ejection deployment and retrieval mechanism, specifically including the following steps:

The working method of the above ejection-release-recovery mechanism specifically comprises the following steps:

1, initial state: as shown in FIG. 5, the spring is compressed by the ejection sleeve, the limiting bulge of the docking rod 8 is locked in the guide groove of the upper locking base 4, the sub-satellite is locked by the locking base, and the mechanism is in the initial ejection state, after the mechanism is energized, the system self-check procedure is executed, and if the self-check passes, proceed to the next step;

2, ejection separation phase: the system issues the instruction to retract the tether, driving the sub-satellite to further compress the ejection sleeve, as shown in FIG. 6, the limiting bulge of docking rod 8 is separated from the upper locking base 4 and contacts the guide groove of the lower locking base 2, as shown in FIG. 7, after contact, the limiting bulge of docking rod 8 continues sliding obliquely downward to reach the bottom of the guide groove of the lower locking base 2, at this point, the spring reaches the maximum compression, the system executes a determinant procedure, and after determining that the retraction is into place, the ejection instruction is executed, the tether is deployed, and the sub-satellite and the docking rod separate outward under the action of the spring, as shown in FIG. 8, after contacting the guide groove of upper locking base 4, the limiting bulge of docking rod 8 continues sliding outward while rotating, finally sliding out of the locking base through the notch in the guide groove of upper locking base 4 (FIG. 9), and the ejection separation process is complete and proceeds to the next step;

3, deployment process: the sub-satellite moves away from the ejection mechanism at a certain velocity, the velocity is gradually reduced under the control of the motor, and motion is stopped when the tether reaches the predetermined deployment length without rebounding; and 4, after the tether remains stationary for a period, the sub-satellite is retracted to the separation ejection docking assembly through tether retrieval, the docking rod 8 enters the upper locking base 4 through the docking guide cone 5, similar to step 2, the limiting bulge of the docking rod 8 slides inside the locking base and finally locks to the side of the locking base 4 without a notch, thereby achieving the retrieval and docking function.

5, steps 2-4 can be repeated many times to achieve the repeatable unlocking and locking of the ejection deployment and retrieval mechanism for tethered satellites.

The above are only preferred embodiments of the present invention, and it should be pointed out that for those of ordinary skill in the art, a number of improvements and embellishments can be made without departing from the principles of the present invention, and these improvements and embellishments should also be regarded as the scope of protection of the present invention.

What is claimed is:

1. An ejection deployment and retrieval mechanism for a tethered satellite with repeatable unlocking and locking, comprising a separation ejection docking assembly and a sub-satellite;

wherein the separation ejection docking assembly comprises an ejection sleeve, a locking mechanism, and a sub-satellite connector, wherein the ejection sleeve adopts a two-stage internal-external sliding connection and provides initial kinetic energy to the sub-satellite by compressing a spring;

wherein the locking mechanism is mounted inside the ejection sleeve, one end of the sub-satellite connector is connected to the sub-satellite, and another end of the sub-satellite connector is slidably engaged with the locking mechanism to complete the locking/unlocking operations of the sub-satellite.

2. The ejection deployment and retrieval mechanism for a tethered satellite with repeatable unlocking and locking according to claim 1, wherein the locking mechanism comprises an upper locking base and a lower locking base, the upper locking base and the lower locking base are provided with a guide groove, respectively, the guide groove formed after the upper locking base and the lower locking base are aligned at a certain angle engages with a limiting bulge on the sub-satellite connector to achieve automatic locking and unlocking functions.

3. The ejection deployment and retrieval mechanism for a tethered satellite with repeatable unlocking and locking according to claim 2, wherein the guide grooves are sawtooth-shaped.

4. The ejection deployment and retrieval mechanism for a tethered satellite with repeatable unlocking and locking according to claim 3, wherein the sawtooth-shaped low end of the guide groove of the upper locking base is provided with two symmetrical notches for the entry and exit of the limiting bulge.

5. The ejection deployment and retrieval mechanism for a tethered satellite with repeatable unlocking and locking according to claim 2, wherein the locking structure comprises a docking guide cone and a fixed sleeve, wherein the docking guide cone is provided with a hexagonal step that engages with the inner hexagonal step of the fixed sleeve, the docking guide cone and upper locking base are positioned in the inner hexagonal groove at the upper part of the fixed sleeve, and the lower locking base is positioned in the inner hexagonal groove at the lower part of the fixed sleeve.

6. The ejection deployment and retrieval mechanism for a tethered satellite with repeatable unlocking and locking according to claim 2, wherein the sub-satellite connector comprises a docking plate and a docking rod, wherein one end of the docking rod is provided with the limiting bulge, and the other end of the docking rod is connected to the sub-satellite by engaging with the docking plate.

7. The ejection deployment and retrieval mechanism for a tethered satellite with repeatable unlocking and locking according to claim 1, wherein the ejection sleeve comprises an inner sleeve, an outer sleeve, and a sleeve limiting cover;

wherein the outer sleeve is on the outside of the inner sleeve and is slidably connected to the inner sleeve, and a top of the inner sleeve is connected to the sleeve limiting cover;

wherein the inner side of the outer sleeve is provided with a step that engages with the sleeve limiting cover, the diameter of the sleeve limiting cover is larger than the outer diameter of the inner sleeve and equal to the inner diameter of the outer sleeve, and the inner diameter of the step on the outer sleeve is equal to the outer diameter of the inner sleeve, thereby achieving a limitation of a maximum ejection displacement of the sleeve through the engaging.

8. The ejection deployment and retrieval mechanism for a tethered satellite with repeatable unlocking and locking according to claim 7, wherein the spring is sleeved outside the outer sleeve, and grooves are arranged at the bottom of the inner sleeve and the top of the outer sleeve for fixing the spring.

9. A working method for the ejection deployment and retrieval mechanism for a tethered satellite with repeatable unlocking and locking according to claim 1, wherein the method comprises the following steps:

S1: initial state: compressing the spring by the ejection sleeve, locking the limiting bulge of the sub-satellite connector in the guide groove, locking the sub-satellite by the locking mechanism, wherein the mechanism is in an initial ejection state;

S2: ejection separation phase: driving the sub-satellite to further compress the ejection sleeve by retracting the tether, separating the limiting bulge from the upper locking base and contacting the guide groove of the lower locking base; wherein, after contacting, the bottom of the guide groove reaches through the limiting bulge and continues sliding obliquely downward, wherein, at this point, the spring reaches a maximum compression, executing an ejection instruction, and deploying the tether, separating the sub-satellite and sub-satellite connector outward under the action of the spring, wherein the sub-satellite connector continues rotating and sliding the limiting bulge outward after contacting the guide groove of the upper locking base, finally sliding out of the locking base through the notch in the guide groove of the upper locking base, completing the ejection separation process;

S3: deployment process: ejecting the sub-satellite away from the ejection mechanism at a certain velocity, gradually reducing the velocity under a control of the motor, and stopping the motion when the tether reaches a predetermined deployment length without rebounding; and S4: retrieval phase: after the tether remains stationary for a period, retracting the sub-satellite to the separation ejection docking assembly through tether retrieval, entering one end of the sub-satellite connector into the locking base while the limiting bulge enters the guide groove, sliding the limiting bulge in the locking base and finally locking in a side of the upper locking base without the notch, thereby achieving the retrieval and docking function.

10. The working method for the ejection deployment and retrieval mechanism for a tethered satellite with repeatable unlocking and locking according to claim 9, wherein steps S2-S4 can be repeated as required.

* * * * *